(12) United States Patent
Epley

(10) Patent No.: US 12,035,689 B2
(45) Date of Patent: Jul. 16, 2024

(54) ANIMAL BIRTH CONTROL DEVICE AND METHODS OF USE

(71) Applicant: Teresa Epley, Wichita Falls, TX (US)

(72) Inventor: Teresa Epley, Wichita Falls, TX (US)

( * ) Notice: Subject to any disclaimer, the term of this patent is extended or adjusted under 35 U.S.C. 154(b) by 91 days.

(21) Appl. No.: 17/890,569

(22) Filed: Aug. 18, 2022

(65) Prior Publication Data
US 2024/0057555 A1 Feb. 22, 2024

(51) Int. Cl.
*A01K 13/00* (2006.01)

(52) U.S. Cl.
CPC .................. *A01K 13/006* (2013.01)

(58) Field of Classification Search
CPC ..................................... A01K 13/006
USPC ........................................... 119/850
See application file for complete search history.

(56) References Cited

U.S. PATENT DOCUMENTS

| | | | | |
|---|---|---|---|---|
| 2,974,635 A | * | 3/1961 | McDowell | A01K 13/006 119/854 |
| 5,463,985 A | * | 11/1995 | Shover | A01K 13/006 54/79.2 |
| 6,142,105 A | | 11/2000 | McKnight | |
| 6,647,928 B1 | * | 11/2003 | Spiller | A01K 21/00 119/854 |
| D874,072 S | * | 1/2020 | Bui | D30/145 |
| 2007/0129702 A1 | | 6/2007 | Gribben | |
| 2017/0156295 A1 | * | 6/2017 | Zoltanski | A01K 13/006 |
| 2018/0007865 A1 | * | 1/2018 | Korth | A01K 13/007 |
| 2018/0221223 A1 | * | 8/2018 | Hanes | A01K 23/00 |
| 2018/0249681 A1 | * | 9/2018 | Martin | A01K 23/00 |

FOREIGN PATENT DOCUMENTS

WO  WO2012132886  10/2012

* cited by examiner

*Primary Examiner* — Joshua J Michener
*Assistant Examiner* — Nicole Paige MacCrate

(57) ABSTRACT

A birth control device for preventing a female animal from copulating includes a pair of panties, which is positionable on a rear end of a female animal. A pair of rear legs and a tail of the female animal extend through a pair of first holes and a second hole, respectively, which are positioned in the panties. Because a vagina of the female animal is covered, the panties deter copulation of the female animal. The second hole is sized such that a rectum of the animal is exposed, thus allowing for defecation by the animal. At least a portion of the panties is meshed and is positioned over the vagina of the female animal allowing for urination by the animal.

9 Claims, 7 Drawing Sheets

ANIMAL BIRTH CONTROL DEVICE AND METHODS OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to birth control devices and more particularly pertains to a new birth control device for preventing a female animal from copulating. The present invention discloses a birth control device for a female animal comprising a pair of panties, which cover a vagina of the female animal to deter copulation.

(2) Description of Related Art Including Information Disclosed Under 37 CFR 1.97 and 1.98

The prior art relates to birth control devices. Related prior art includes diapers, pants, and panties for animals, which are configured to retain urine and fecal matter, but which are not intended to prevent copulation. What is lacking in the prior art is a birth control device for female animals comprising a pair of panties that is configured for passage of urine and fecal matter, nor does it teach such panties comprising a pocket configured for insertion of an absorbent pad to retain menstrual fluid.

BRIEF SUMMARY OF THE INVENTION

An embodiment of the disclosure meets the needs presented above by generally comprising a pair of panties, which is configured to be positioned on a rear end of a female animal. A pair of rear legs and a tail of the female animal extend through a pair of first holes and a second hole, respectively, which are positioned in the panties. Because a vagina of the female animal is covered, the panties are configured to deter copulation of the female animal. The second hole is sized such that a rectum of the animal is exposed, thus the panties are configured to allow for defecation by the animal. At least a portion of the panties is meshed and is positioned over the vagina of the female animal. Therefore, the panties are configured to allow for urination by the animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
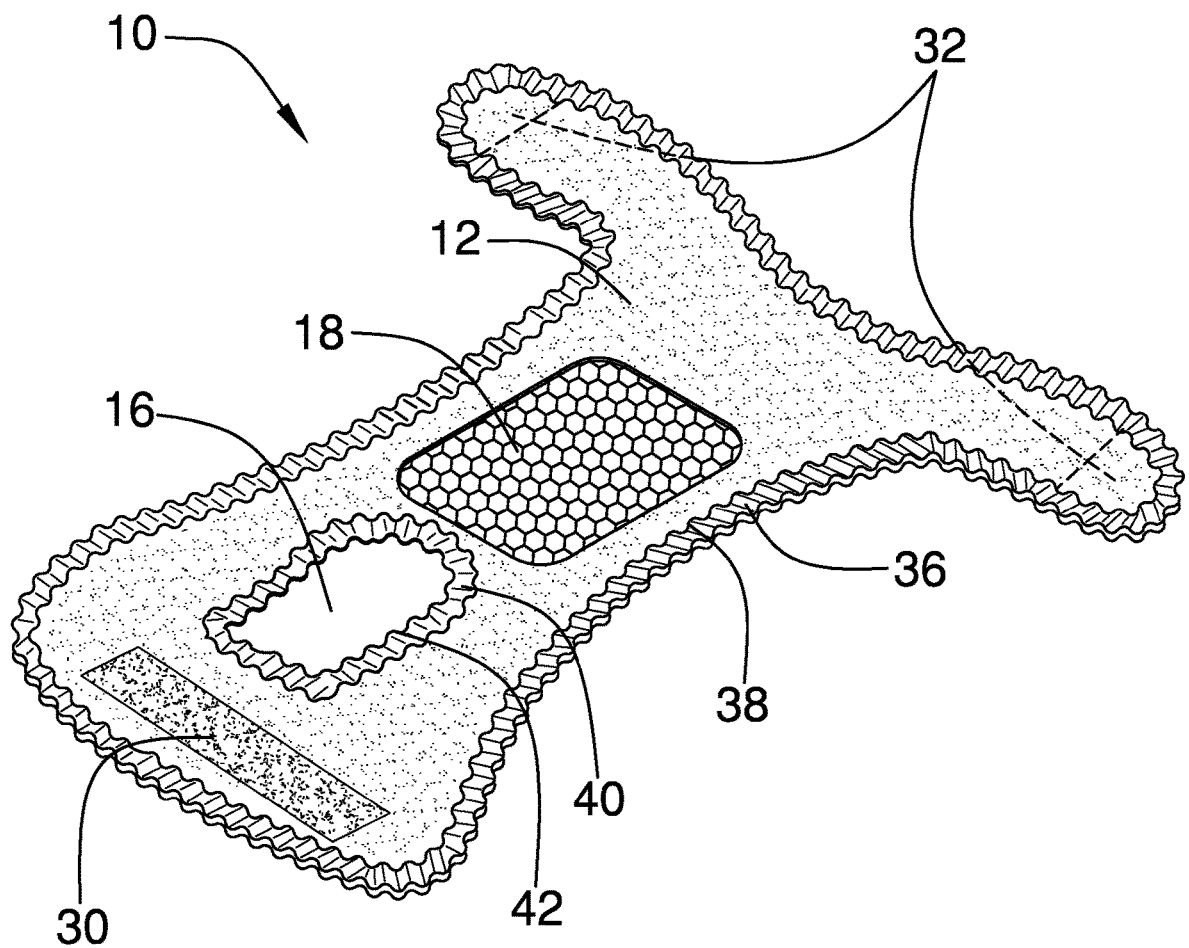
FIG. 1 is an isometric perspective view of a birth control device according to an embodiment of the disclosure.
Figure 2:
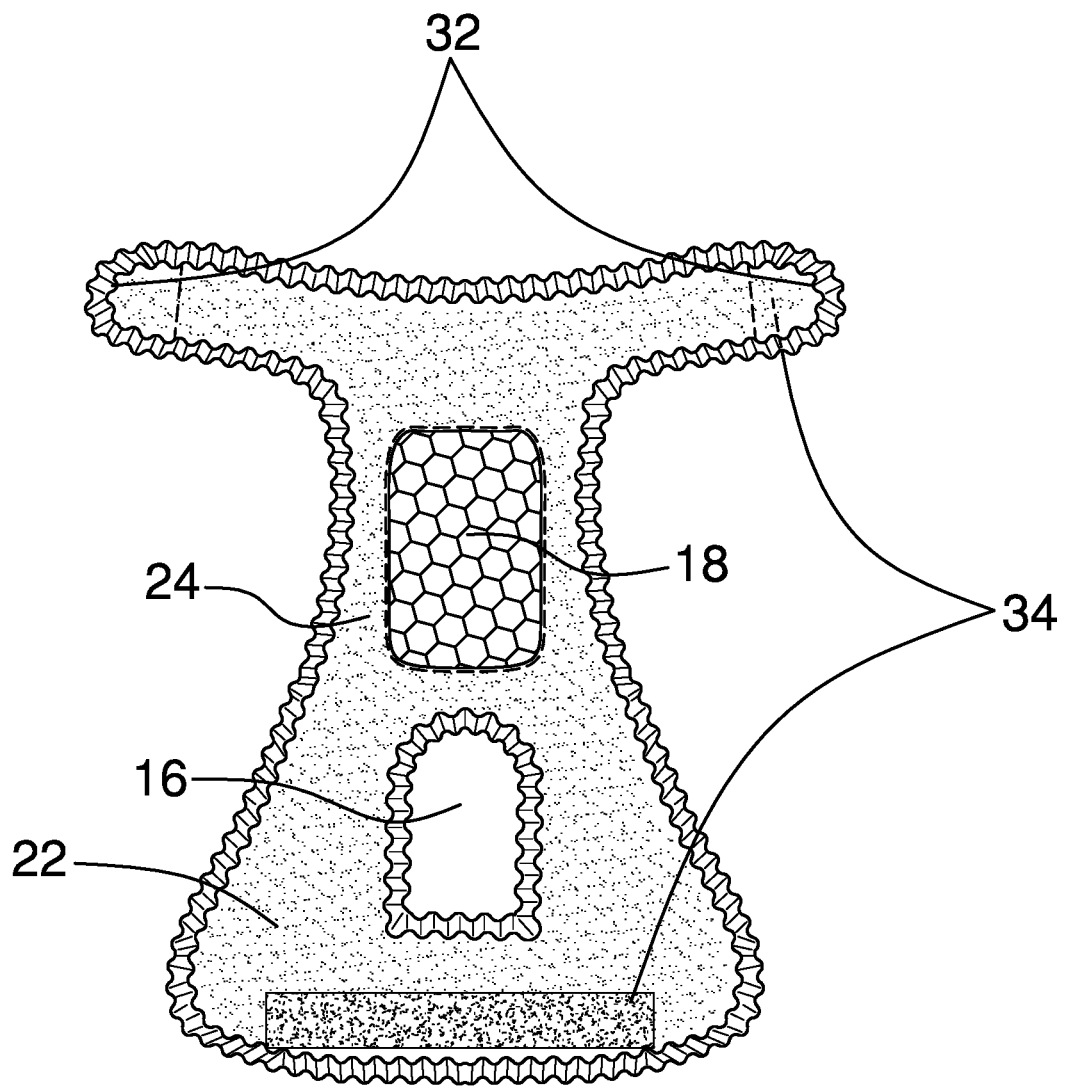
FIG. 2 is a front view of an embodiment of the disclosure.
Figure 3:
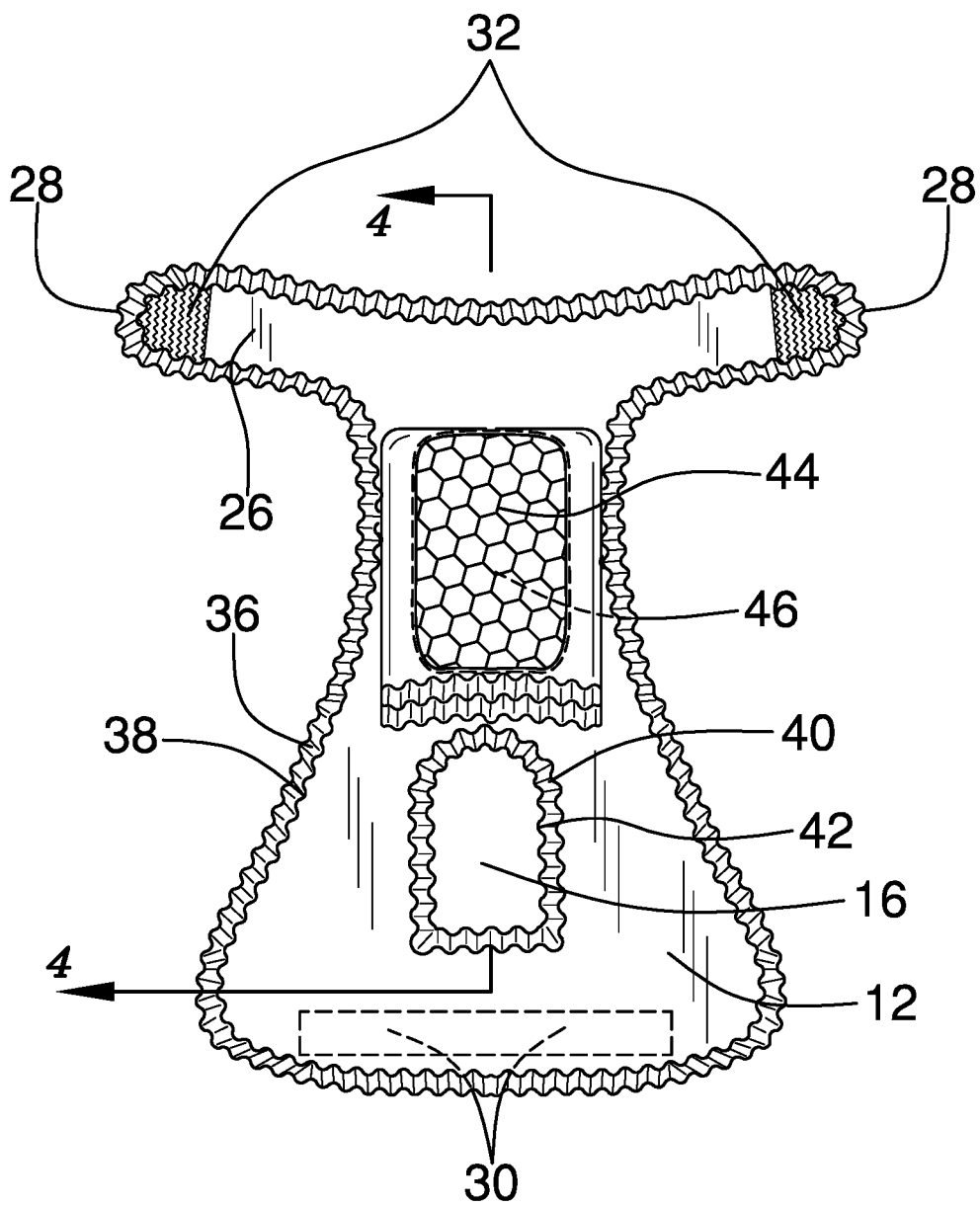
FIG. 3 is a rear view of an embodiment of the disclosure.
Figure 4:
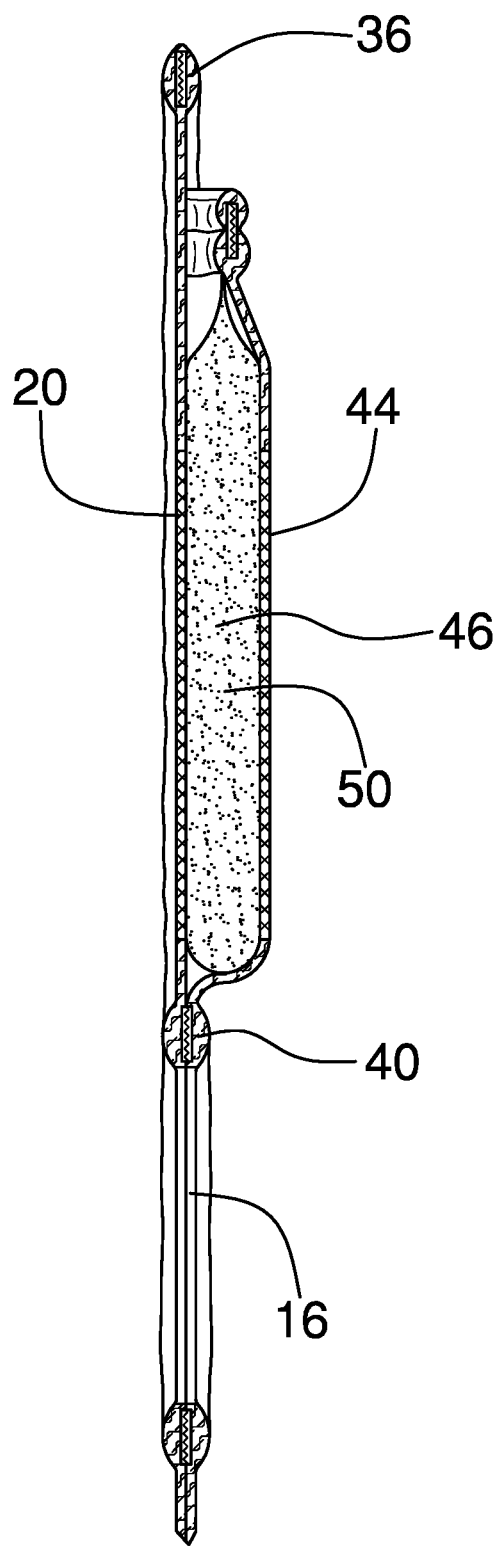
FIG. 4 is a cross-sectional view of an embodiment of the disclosure.

With reference now to the drawings, and in particular to FIGS. 1 through 8 thereof, a new birth control device embodying the principles and concepts of an embodiment of the disclosure and generally designated by the reference numeral 10 will be described.

As best illustrated in FIGS. 1 through 8, the birth control device 10 generally comprises a pair of panties 12, which is configured to be positioned on a rear end of a female animal. A pair of rear legs and a tail of the female animal extend through a pair of first holes 14 and a second hole 16, respectively, which are positioned in the panties 12. Because a vagina of the female animal is covered, the panties 12 are configured to deter copulation of the female animal. The second hole 16 is sized such that a rectum of the animal is exposed, thus the panties 12 are configured to allow for defecation by the animal. At least a portion 18 of the panties 12 is meshed and is positioned over the vagina of the female animal. Therefore, the panties 12 are configured to allow for urination by the animal. The present invention anticipates the pair of panties 12 being substantially entirely meshed.

Figure 5:
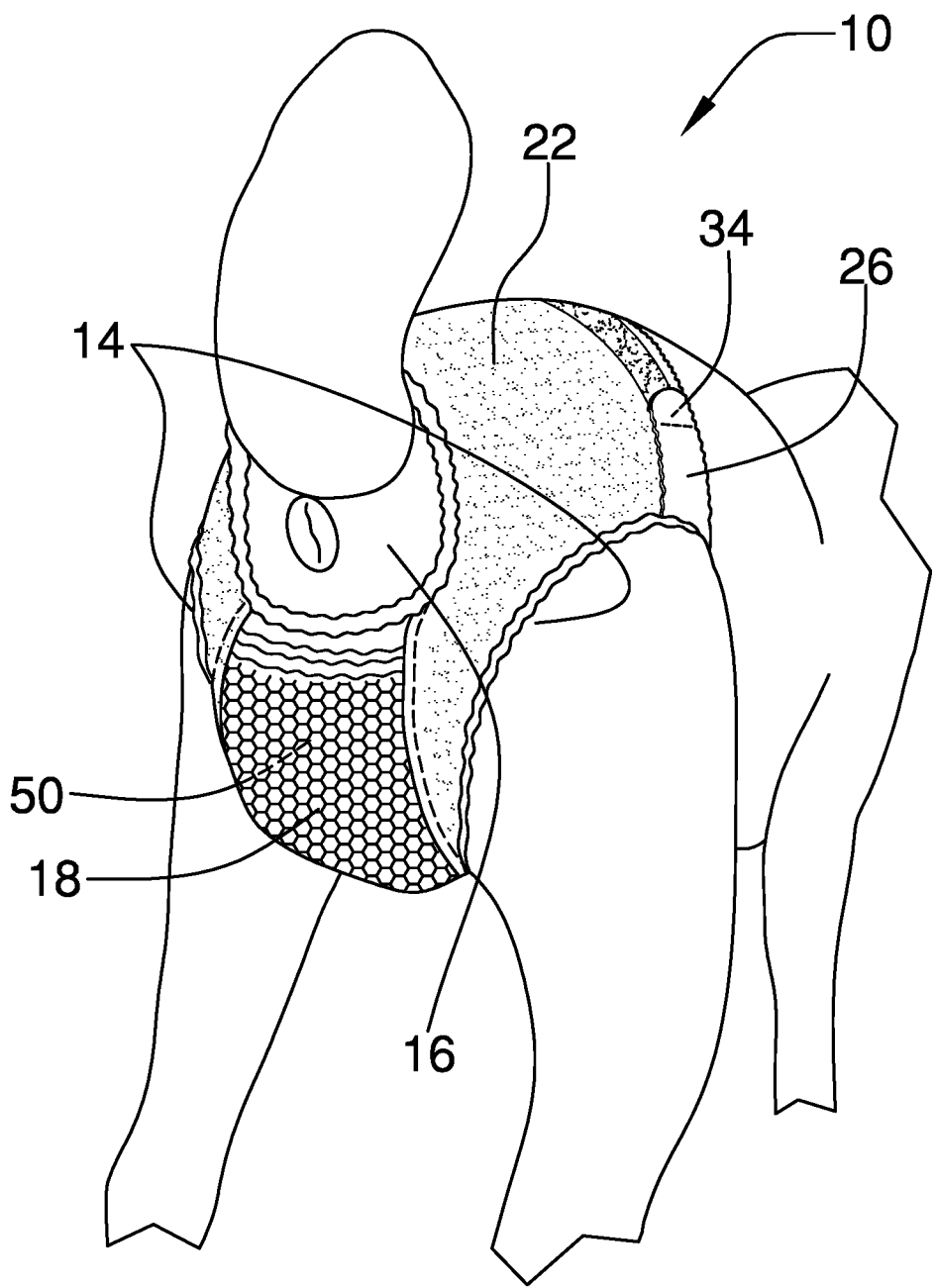
FIG. 5 is an in-use view of an embodiment of the disclosure.
Figure 6:
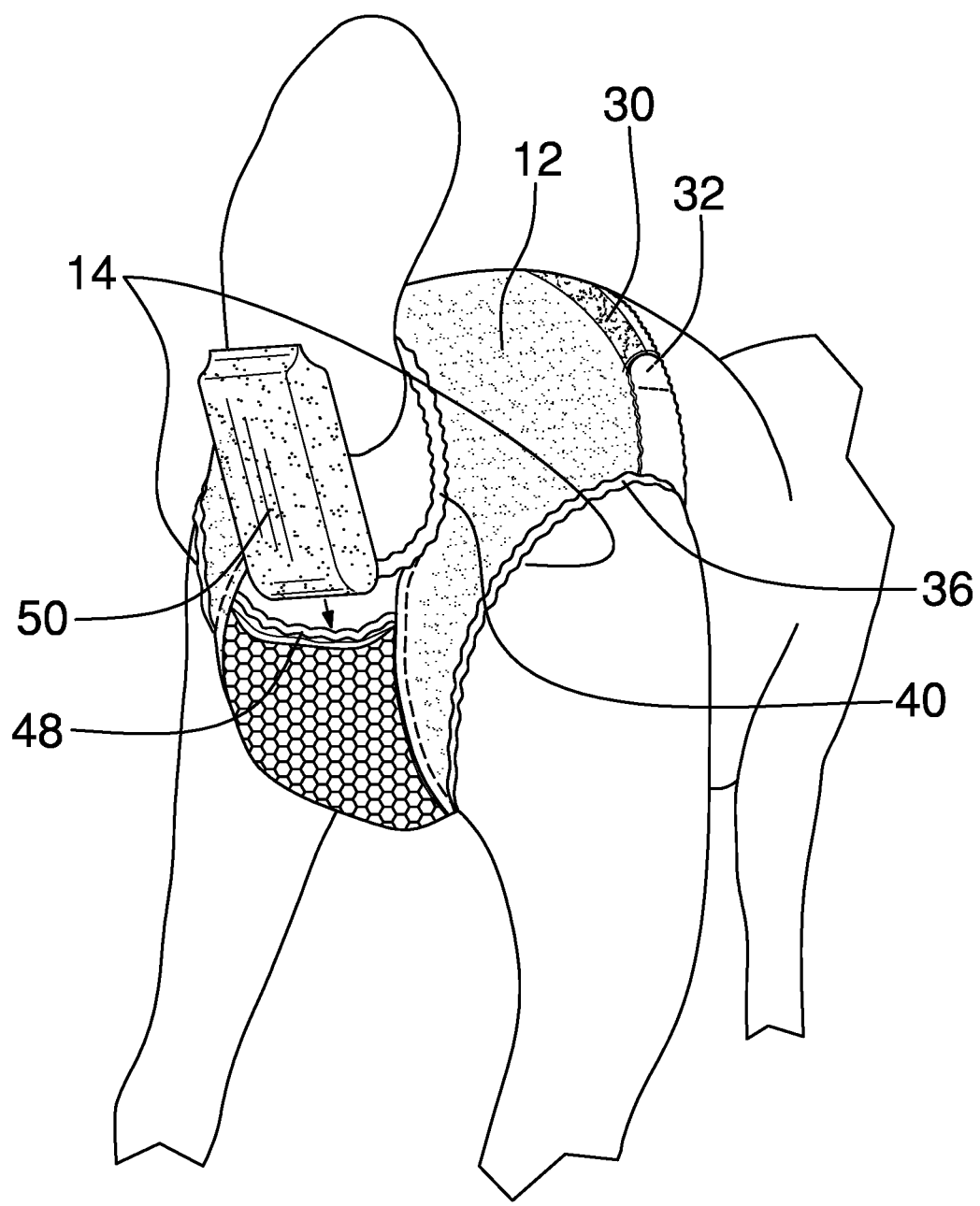
FIG. 6 is an in-use view of an embodiment of the disclosure.
Figure 7:
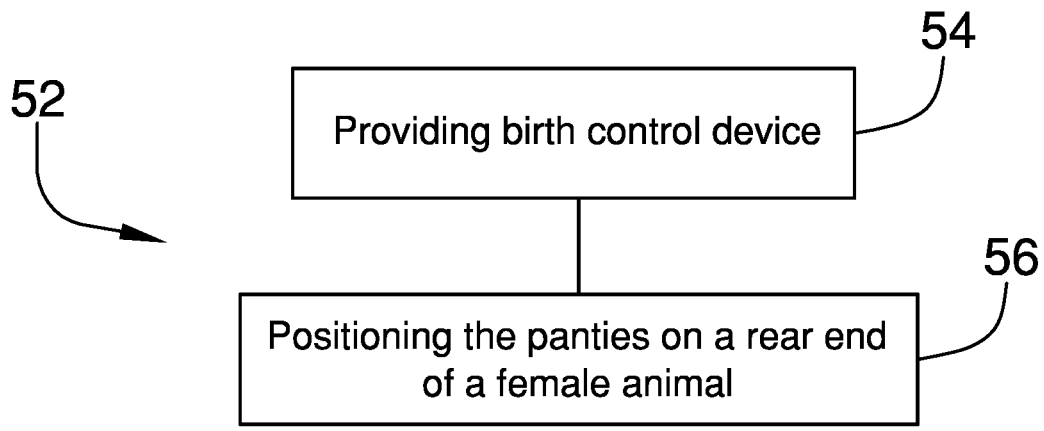
FIG. 7 is a flow diagram for a method utilizing an embodiment of the disclosure.
Figure 8:
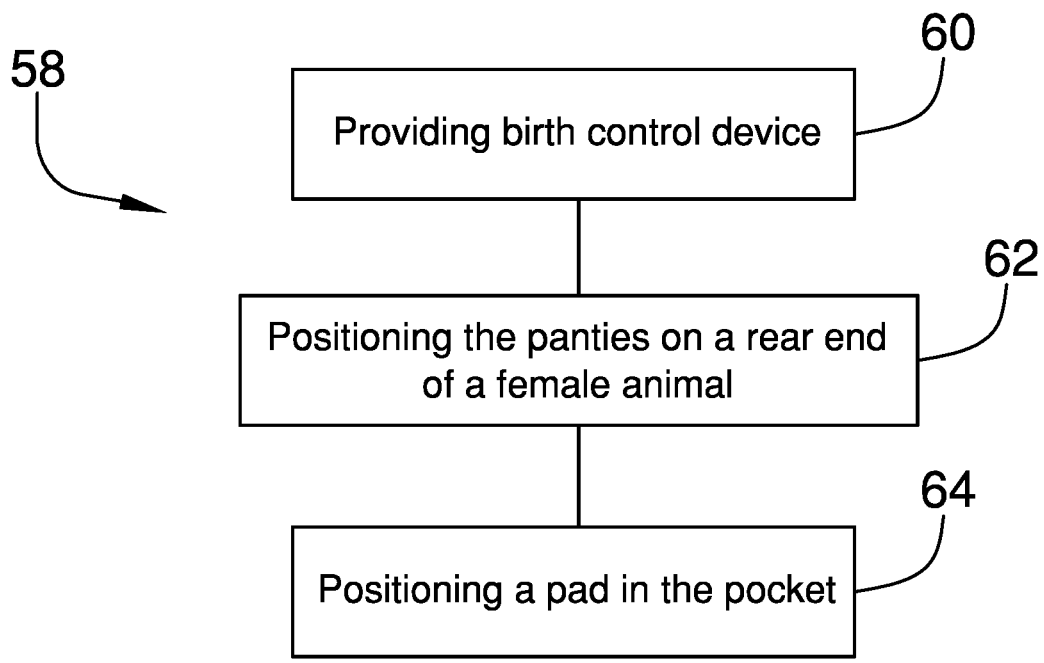
FIG. 8 is a flow diagram for a method utilizing an embodiment of the disclosure.

The panties 12 comprise a first panel 20, which comprises a first section 22, a second section 24, and a third section 26. The first section 22, in which the second hole 16 is positioned, is sized to extend over a croup and loins of the female animal upon insertion of the tail through the second hole 16, as is shown in FIG. 5. The second section 24 extends from the first section 22 and is sized to extend between buttocks of the female animal to proximate a tuck of the female animal. The second section 24 is configured to cover the vagina of the female animal. The third section 26 extends bidirectionally from the second section 24, distal from the first section 22, so that opposed ends 28 of the third section 26 are positioned to overlap, selectively and partially, the first section 22.

A pair of first fasteners 30 is attached to the first section 22 and a pair of second fasteners 32 is attached to the third section 26. The second fasteners 32 are complementary to the first fasteners 30, with each second fastener 32 being positioned proximate to a respective opposed end 28 of the third section 26. Each second fastener 32 is positioned to selectively engage a respective first fastener 30 to removably secure the first panel 20 to the female animal and defining the pair of first holes 14 in the panties 12. The second fastener 32 and the respective first fastener 30 may comprise a hook and loop fastener 34, or other fastening means, such as, but not limited to, clasps, adhesives, button closures, and the like. The hook and loop fastener 34 is selectively adjustable, allowing the panties 12 to fit to female animals of various sizes.

A first band 36 is attached to and extends around a perimeter 38 of the first panel 20. A second band 40 is attached to the first panel 20 and extends around a circumference 42 of the second hole 16. The first band 36 and the second band 40, which comprise elastomer, rubber, or silicone, or the like, are resiliently stretchable, enabling the panties 12 to fit snugly, yet comfortably, to the female animal.

A second panel 44 is attached to the panties 12 and defines a pocket 46, which is positioned over the vagina. The second panel 44 is meshed and an opening 48 of the pocket 46 is positioned proximate to the second hole 16 for ease of access. A pad 50, which is absorbent, is selectively insertable into the pocket 46. The pad 50 is configured to absorb menstrual fluid that is secreted by the female animal, but also can be used to address incontinence issues in both female and male animals.

The birth control device 10 enables a method for preventing impregnation of an animal 52. The method 52 comprises a first step 54 of providing a birth control device 10 according to the specification above. A second step 56 of the method 52 is positioning a pair of panties 12 on a rear end of a female animal so that a vagina of the female animal is covered and copulation of the female animal is deterred.

The birth control device 10 also enables a method for retaining menstrual fluid and preventing impregnation of an animal 58. The method 58 comprises a first step 60 of providing birth control device 10 according to the specification above, with the birth control device 10 including a second panel 44 attached to the panties 12 so that the second panel 44 defines a pocket 46. A second step 62 of the method 58 is positioning a pair of panties 12 on a rear end of a female animal so that the second panel 44 is positioned over a vagina of the female animal, thereby deterring copulation of the female animal. A third step 64 of the method 58 is positioning a pad 50 in the pocket 46, where the pad 50 is positioned to absorb menstrual fluid when it is secreted by the female animal. Typically, the pad 50 would be removed when the female animal is outdoors but would be positioned in the pocket 46 when the female animal is indoors. The method 58 also can be used to address incontinence of either the female animal or a male animal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A birth control device comprising a pair of panties configured to be positioned on a rear end of a female animal, such that a pair of rear legs and a tail of the female animal extend through a pair of first holes and a second hole, respectively, positioned in the panties, and such that a vagina of the female animal is covered, wherein the panties are configured for deterring copulation of the female animal, the second hole being sized such that a rectum of the animal is exposed, wherein the panties are configured for allowing defecation by the animal, at least a portion of the panties being meshed, the at least a portion of the panties being positioned over the vagina of the female animal, wherein the panties are configured for allowing urination by the animal, the panties further comprising:
    a first panel, the first panel comprising:
        a first section, the second hole being positioned in the first section, the first section being sized for extending over a croup and loins of the female animal upon insertion of the tail through the second hole;
        a second section extending from the first section, the second section being narrower than the first section wherein the second section is sized for extending between buttocks of the female animal to proximate to a tuck of the female animal, wherein the second section is configured for covering the vagina of the female animal; and
        a third section extending bidirectionally from the second section distal from the first section, such that opposed ends of the third section are positioned for selective partial overlap of the first section.

2. The birth control device of claim 1, the panties further comprising:
    a pair of first fasteners attached to the first section; and
    a pair of second fasteners attached to the third section, the second fasteners being complementary to the first fasteners, each second fastener being positioned proximate to a respective opposed end of the third section, such that each second fastener is positioned for selectively engaging a respective first fastener for removably securing the first panel to the female animal.

3. The birth control device of claim 2, wherein the second fastener and the respective first fastener comprising a hook and loop fastener.

4. The birth control device of claim 1, further including:
a first band attached to and extending around a perimeter of the first panel, the first band being resiliently stretchable; and
a second band attached to the first panel and extending around a circumference of the second hole, the second band being resiliently stretchable.

5. The birth control device of claim 4, wherein the second band and the first band comprise elastomer, rubber, or silicone.

6. The birth control device of claim 1, further including:
a second panel attached to the panties, such that the second panel defines a pocket positioned over the vagina, the second panel being meshed; and
a pad selectively insertable into the pocket, the pad being absorbent, wherein the pad is configured for absorbing menstrual fluid secreted by the female animal.

7. The birth control device of claim 1, further comprising:
a pair of first fasteners attached to the first section;
a pair of second fasteners attached to the third section, the second fasteners being complementary to the first fasteners, each second fastener being positioned proximate to a respective opposed end of the third section, such that each second fastener is positioned for selectively engaging a respective first fastener for removably securing the first panel to the female animal, the second fastener and the respective first fastener comprising a hook and loop fastener;
a first band attached to and extending around a perimeter of the first panel, the first band being resiliently stretchable;
a second band attached to the first panel and extending around a circumference of the second hole, the second band being resiliently stretchable, the second band and the first band comprising elastomer, rubber, or silicone;
a second panel attached to the panties, such that the second panel defines a pocket positioned over the vagina, the second panel being meshed; and
a pad selectively insertable into the pocket, the pad being absorbent, wherein the pad is configured for absorbing menstrual fluid secreted by the female animal.

8. A method for preventing impregnation of an animal comprising the steps of:
providing a birth control device comprising a pair of panties configured to be positioned on a rear end of a female animal, such that a pair of rear legs and a tail of the female animal extend through a pair of first holes and a second hole, respectively, positioned in the panties, and such that a vagina of the female animal is covered, wherein the panties are configured for deterring copulation of the female animal, the second hole being sized such that a rectum of the animal is exposed, wherein the panties are configured for allowing defecation by the animal, at least a portion of the panties being meshed, the at least a portion of the panties being positioned over the vagina of the female animal, wherein the panties are configured for allowing urination by the animal, the panties further comprising: a first panel comprising:
a first section, the second hole being positioned in the first section, the first section being sized for extending over a croup and loins of the female animal upon insertion of the tail through the second hole;
a second section extending from the first section, the second section being narrower than the first section wherein the second section is sized for extending between buttocks of the female animal to proximate to a tuck of the female animal, wherein the second section is configured for covering the vagina of the female animal;
a third section extending bidirectionally from the second section distal from the first section, such that opposed ends of the third section are positioned for selective partial overlap of the first section; and
positioning the panties on the rear end of the female animal.

9. A method for retaining menstrual fluid and preventing impregnation of an animal comprising the steps of:
providing a birth control device comprising:
a pair of panties configured to be positioned on a rear end of a female animal, such that a pair of rear legs and a tail of the female animal extend through a pair of first holes and a second hole, respectively, positioned in the panties, and such that a vagina of the female animal is covered, the second hole being sized such that a rectum of the animal is exposed, wherein the panties are configured for allowing defecation by the animal, at least a portion of the panties being meshed, the at least a portion of the panties being positioned over the vagina of the female animal, wherein the panties are configured for allowing urination by the animal, the panties further comprising:
a first panel comprising:
a first section, the second hole being positioned in the first section, the first section being sized for extending over a croup and loins of the female animal upon insertion of the tail through the second hole;
a second section extending from the first section, the second section being narrower than the first section wherein the second section is sized for extending between buttocks of the female animal to proximate to a tuck of the female animal, wherein the second section is configured for covering the vagina of the female animal;
a third section extending bidirectionally from the second section distal from the first section, such that opposed ends of the third section are positioned for selective partial overlap of the first section;
a second panel attached to the panties, such that the second panel defines a pocket positioned over the vagina, the second panel being meshed;
a pad selectively insertable into the pocket, the pad being absorbent;
positioning the panties on the rear end of the female animal, wherein the panties are configured for deterring copulation of the female animal; and
positioning the pad in the pocket, wherein the pad is configured for absorbing menstrual fluid secreted by the female animal.

\* \* \* \* \*